US011932007B2

(12) United States Patent
Arteaga del Arco et al.

(10) Patent No.: US 11,932,007 B2
(45) Date of Patent: Mar. 19, 2024

(54) PRINTING APPARATUSES WITH VACUUM SYSTEMS

(71) Applicant: Hewlett-Packard Development Company, L.P., Spring, TX (US)

(72) Inventors: Pablo Arteaga del Arco, Sant Cugat del Valles (ES); Martin Urrutia Nebreda, Sant Cugat del Valles (ES); David Melero Cazorla, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/417,713

(22) PCT Filed: Jun. 10, 2019

(86) PCT No.: PCT/US2019/036224

§ 371 (c)(1),
(2) Date: Jun. 23, 2021

(87) PCT Pub. No.: WO2020/251519

PCT Pub. Date: Dec. 17, 2020

(65) Prior Publication Data

US 2022/0118776 A1 Apr. 21, 2022

(51) Int. Cl.
*B41J 11/00* (2006.01)
*B41J 11/06* (2006.01)

(52) U.S. Cl.
CPC ............ *B41J 11/0085* (2013.01); *B41J 11/06* (2013.01)

(58) Field of Classification Search
CPC ............................... B41J 11/0085; B41J 11/06
See application file for complete search history.

(56) References Cited

U.S. PATENT DOCUMENTS

| | | | |
|---|---|---|---|
| 6,254,081 | B1 | 7/2001 | Rasmussen et al. |
| 6,927,841 | B2 | 8/2005 | Hinojosa et al. |
| 7,390,085 | B2 | 6/2008 | Ishii et al. |
| 8,157,369 | B2 | 4/2012 | Hoover et al. |
| 8,292,421 | B2 | 10/2012 | Mandel et al. |

(Continued)

FOREIGN PATENT DOCUMENTS

| | | |
|---|---|---|
| CN | 104334358 A | 2/2015 |
| CN | 106414090 A | 2/2017 |

(Continued)

OTHER PUBLICATIONS

Luo, Shi-an, A Vacuum Adsorption System Universal Self-sealing Self-closing Coupler, Sep. 27, 2019, China, All Pages (Year: 2019).*

*Primary Examiner* — Justin Seo
*Assistant Examiner* — Tracey M McMillion

(57) ABSTRACT

A vacuum system for a printing apparatus comprises a structural member. The structural member comprises a fluid conduit to be connected to a vacuum source. The vacuum system comprises a coupling. The coupling comprises a first end and a second end defining a fluid passage therebetween. The coupling is attached to the structural member at its first end thereby connecting the fluid passage of the coupling to the fluid conduit of the structural member. The second end of the coupling comprises a resiliently deformable material. The second end is to connect to a vacuum chamber of a print unit.

5 Claims, 11 Drawing Sheets

(56) References Cited

U.S. PATENT DOCUMENTS

| | | | | |
|---|---|---|---|---|
| 8,505,890 | B2 | 8/2013 | Toya | |
| 8,882,261 | B2 | 11/2014 | Spence et al. | |
| 10,167,154 | B2 | 1/2019 | Latorre | |
| 2008/0012931 | A1 | 1/2008 | Gros et al. | |
| 2017/0136787 | A1 | 5/2017 | Martin et al. | |
| 2018/0257898 | A1* | 9/2018 | Arredondo ........... | B65H 29/241 |
| 2018/0319169 | A1 | 11/2018 | Sing et al. | |
| 2020/0002117 | A1 | 1/2020 | Dekel et al. | |
| 2020/0086664 | A1 | 3/2020 | Verheijen et al. | |

FOREIGN PATENT DOCUMENTS

| | | | |
|---|---|---|---|
| CN | 107073946 | A | 8/2017 |
| CN | 108016832 | A | 5/2018 |
| CN | 108349260 | A | 7/2018 |
| CN | 110087889 | A | 8/2019 |
| JP | 2001-019219 | A | 1/2001 |
| WO | 2003/093021 | A1 | 11/2003 |
| WO | WO-2018114303 | A1 | 6/2018 |

* cited by examiner

PRINTING APPARATUSES WITH VACUUM SYSTEMS

BACKGROUND

A printing apparatus may have a print platen on which a print media advances toward and through a printing station. At the printing station printing fluid may be deposited onto the print media to perform and complete a print job.

BRIEF DESCRIPTION OF DRAWINGS

Examples will now be described, by way of non-limiting example, with reference to the accompanying drawings, in which.

DETAILED DESCRIPTION

Some printing systems operate using narrow tolerances in terms of flatness to achieve an acceptable level of image quality. However, some printing systems achieve these “flatness specs” in ways that are not considered to be cost-competitive. For example, it can be costly to manufacture a printing system where an aluminium extrusion is sealed with a plastic platen, by means of screws or the like. Even when printing systems are manufactured in a low-cost, or cost-competitive way, they still need to meet minimum acceptable thresholds in terms of print quality. For example, many printing systems can cause vertical banding which can arise when there is air movement on or around the print platen, or when the print platen is not smooth. Other defects that printing systems seek to avoid are media jams, media smears and wrinkles in the print medium.

Some examples herein relate to a vacuum system for a printing apparatus, in which a number of print units may be connected to form the printing system. In this way some examples relate to a modular printing apparatus comprising a number of print unit “modules”. According to these examples, each print unit comprises a print platen and vacuum chamber (formed by the print platen and a wall of the print unit) where the negative pressure therein will hold the print media to the print platen during a printing operation. The vacuum system according to the examples described herein enables each of these modular print units to be connected to a source of a vacuum (also known as a source of negative pressure) in order for each print unit to function effectively as part of the printing system. For this purpose, the vacuum system may comprise a structural member such as a metal beam having a fluid conduit therein to supply a vacuum pressure to each chamber of each print unit. As will be described below, each print unit may be connected to another print unit so as to provide a smooth print platen (to reduce instances of vertical banding, and as each print unit comprises a vacuum chamber this will enable the print platen to “hold down” the print media, to thereby reduce instances of wrinkles, smears and jamming. Each unit may be self-contained and may easily be connected to the vacuum system, as will be described with reference to examples below. The resulting printing system may be cost-effective to manufacture, and easy to both assemble and disassembly by a user.

Figure 1:
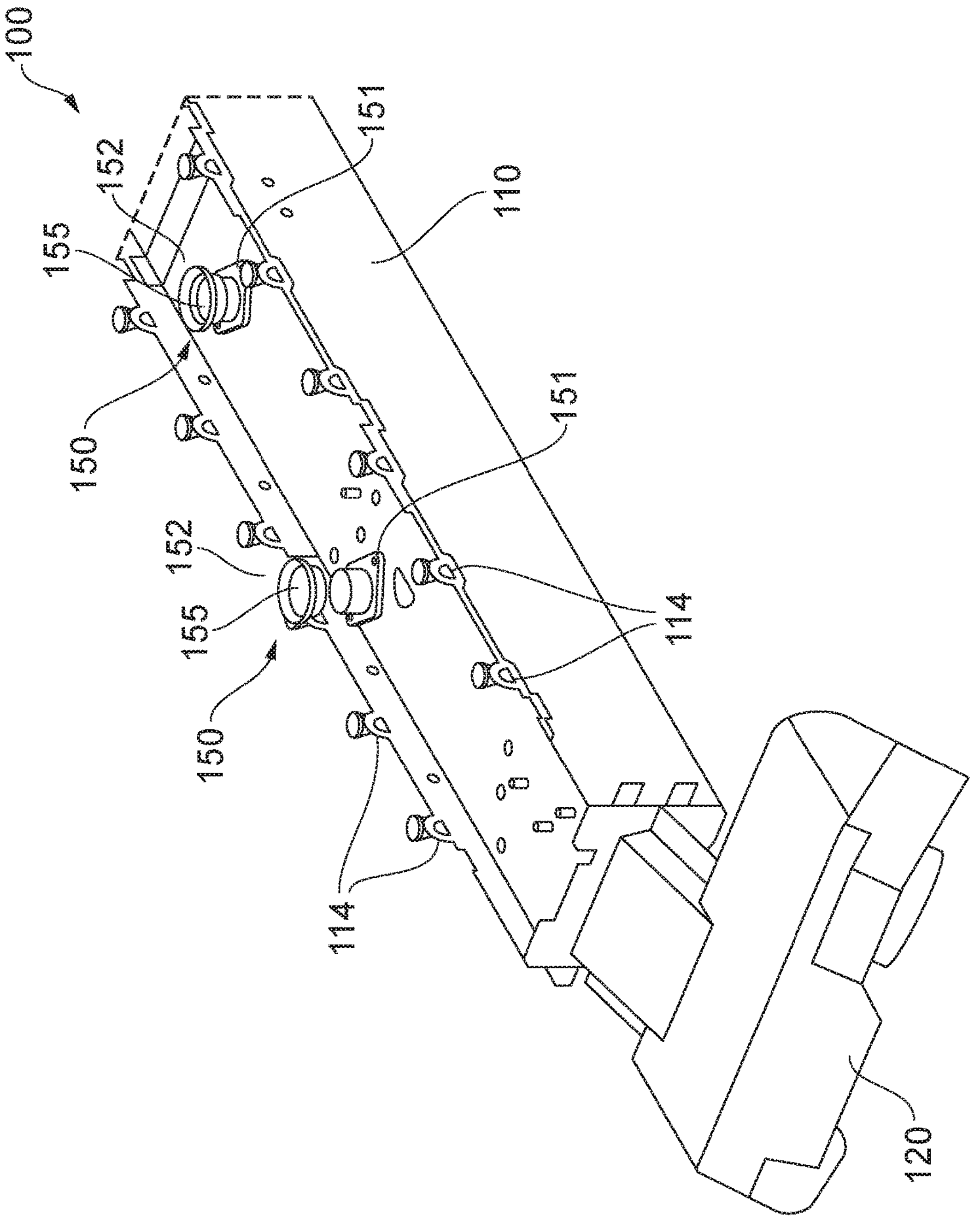
FIG. 1 is a simplified schematic of an example vacuum system for a print apparatus.
Figure 2:
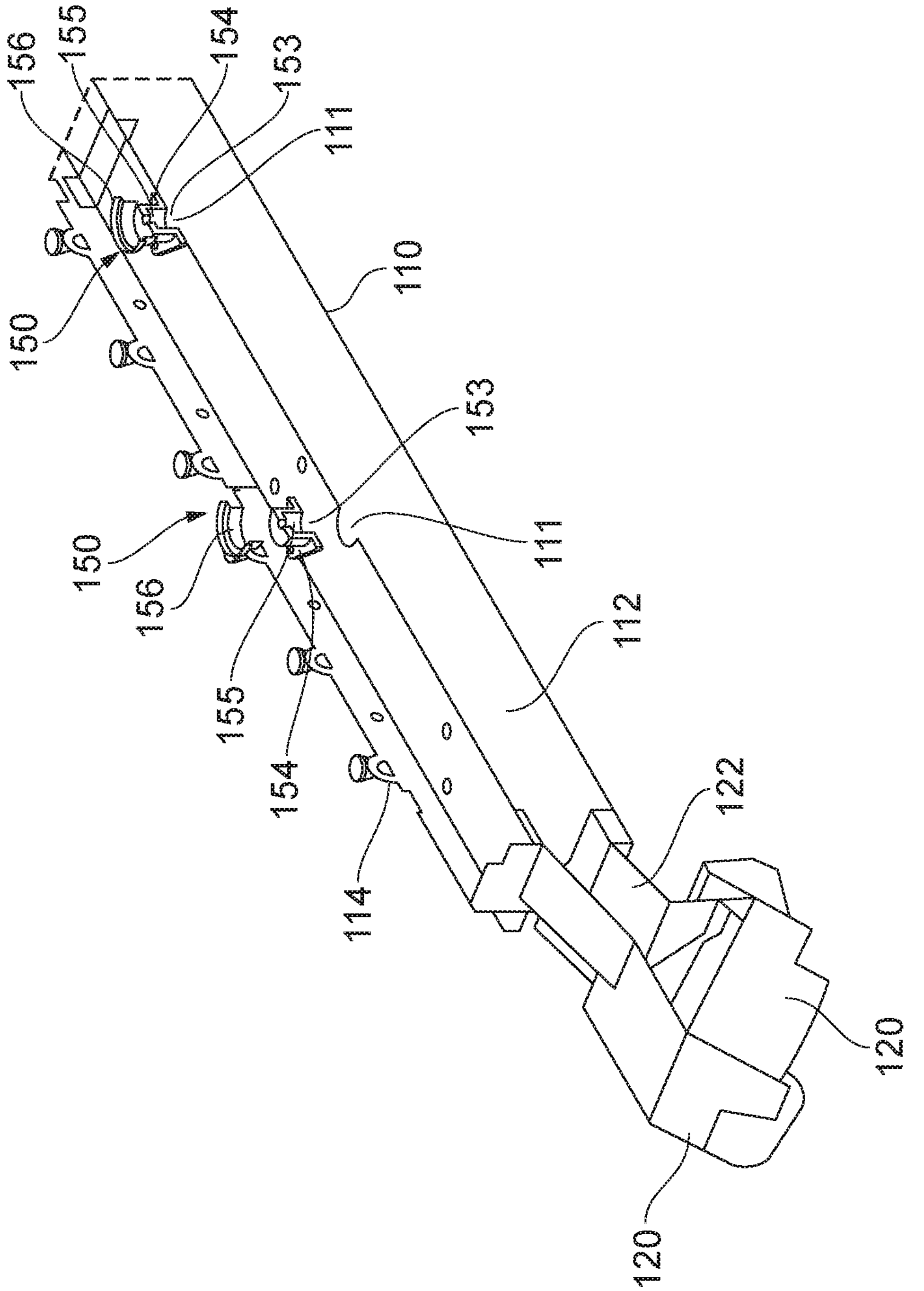
FIG. 2 is a cross-section through the example vacuum system shown in FIG. 1.

FIG. 1 is a perspective view of an example vacuum system 100 for a printing system and FIG. 2 is a cutaway view of the vacuum system 100 of FIG. 1. The vacuum system 100 comprises a structural member 110 and a vacuum source 120. The structural member comprises a fluid conduit 112 connected to the vacuum source 120. The vacuum system 100 also comprises a coupling 150, two of which are shown in FIGS. 1 and 2 and one of which is shown in exploded view. The coupling 150 comprises a first end 151 and a second end 152 defining a fluid passage 155 therebetween, the fluid passage 155 extending through the coupling 150. The coupling 150 is attached to the structural member 110 at its first end 151 and the second end 152 of the coupling 150 comprises a resiliently deformable material (depicted in the examples herein as a collar, however other shapes may be envisaged). In one example, the resiliently deformable material comprises a flexible material. For example, the resiliently deformable material may comprise rubber, e.g. a flexible rubber. The second end 152 is to connect to a vacuum chamber of a print unit (not shown in FIGS. 1 and 2 but to be described later). The coupling 150 is attached to the structural member 110 so that it connects the fluid passage 155 of the coupling 150 to the fluid conduit 112 of the structural member 110. In this way, the vacuum system 100 of FIG. 1 is capable of providing an air channel to a vacuum source using a structural member as the fluid conduit.

The vacuum source 120 is capable of generating a negative, suction, pressure. For this purpose, the vacuum source 120 comprises a vacuum generator 121 (such as, for example, a vacuum fan) to generate negative, suction, pressure and a vacuum fluid conduit 122 which may be regarded as a port of the vacuum source 120. The vacuum generator 121 is therefore to create negative, suction, pressure in the vacuum fluid conduit 122 and therefore in any conduit connected to the vacuum fluid conduit 122. In the example of FIGS. 1 and 2, the fluid conduit 112 of the structural member 110 is fluidly connected to the vacuum fluid conduit 122. Therefore, the vacuum source 120 (more specifically, the vacuum generator 121 thereof) is to create negative, suction, pressure in the fluid conduit 112 of the structural member 110. As described above, the coupling 150 is attached to the structural member 110 so that the fluid passage 155 of the coupling 150 is in fluid communication with the fluid conduit 112 of the structural member 110. For this purpose, the structural member 110 comprises a hole 111 to engage with the first end 151 of the coupling. In one example, the hole 111 may be of corresponding size and shape to the first end 151 of the coupling, and/or of corresponding size and shape to an opening in the first end 151 of the coupling, and/or of corresponding size and shape to the fluid passage 155. When the coupling 150 is attached to the structural member 110 the hole 111 of the structural member may be aligned with the passage 155 of the coupling 150. In this way, in the example of FIGS. 1 and 2, the vacuum source 120 (more specifically, the vacuum generator 121 thereof) is to create negative, suction, pressure in the fluid passage 155 of the coupling 150.

In one example, the first end 151 of the coupling 150 comprises a first opening 153 and flange 154. In this way, the flange 154 provides a part of the coupling 150 that may lie flush with a surface of the structural member 110 for permitting a secure connection thereto, for example via bolts extending through a hole in the flange 154 and a hole in the structural member 110. The first end 151 of the coupling 150 may comprise a rigid material. The flange 154 may comprise the rigid material. Accordingly, in one example, the coupling 150 comprises a mechanical connection to the structural member. The mechanical connection may comprise a flange at the first end. In one example, the second end 152 of the coupling 150 comprises a second opening 156 and the resiliently deformable element surrounds the opening 156. For example, the coupling 150 may comprise a resiliently deformable collar at a second end 152 of the coupling. The resiliently deformable material may comprise a fluid passage and the fluid passage 155 of the coupling 150 may comprise a fluid passage extending through the body of the coupling and through a resiliently deformable collar.

The structural member 110 may comprise part of a printing apparatus or may be to connect to part of a printing apparatus. The structural member 110 may comprise a metal (for example, the structural member may comprise electro-galvanised (EG) steel and/or stainless steel and/or aluminium sheet metal). The structural member 110 may comprise a sheet metal beam. The fluid conduit of the structural member may be sealed. In one example, therefore, the structural member may comprise a sealed metal beam. The structural member 110 comprises an opening 114 for receipt of part of a (not shown) print unit to connect the print unit to the structural member. In one example the structural member may comprise a structural beam, for example a structural beam of a printing apparatus.

Figure 3:
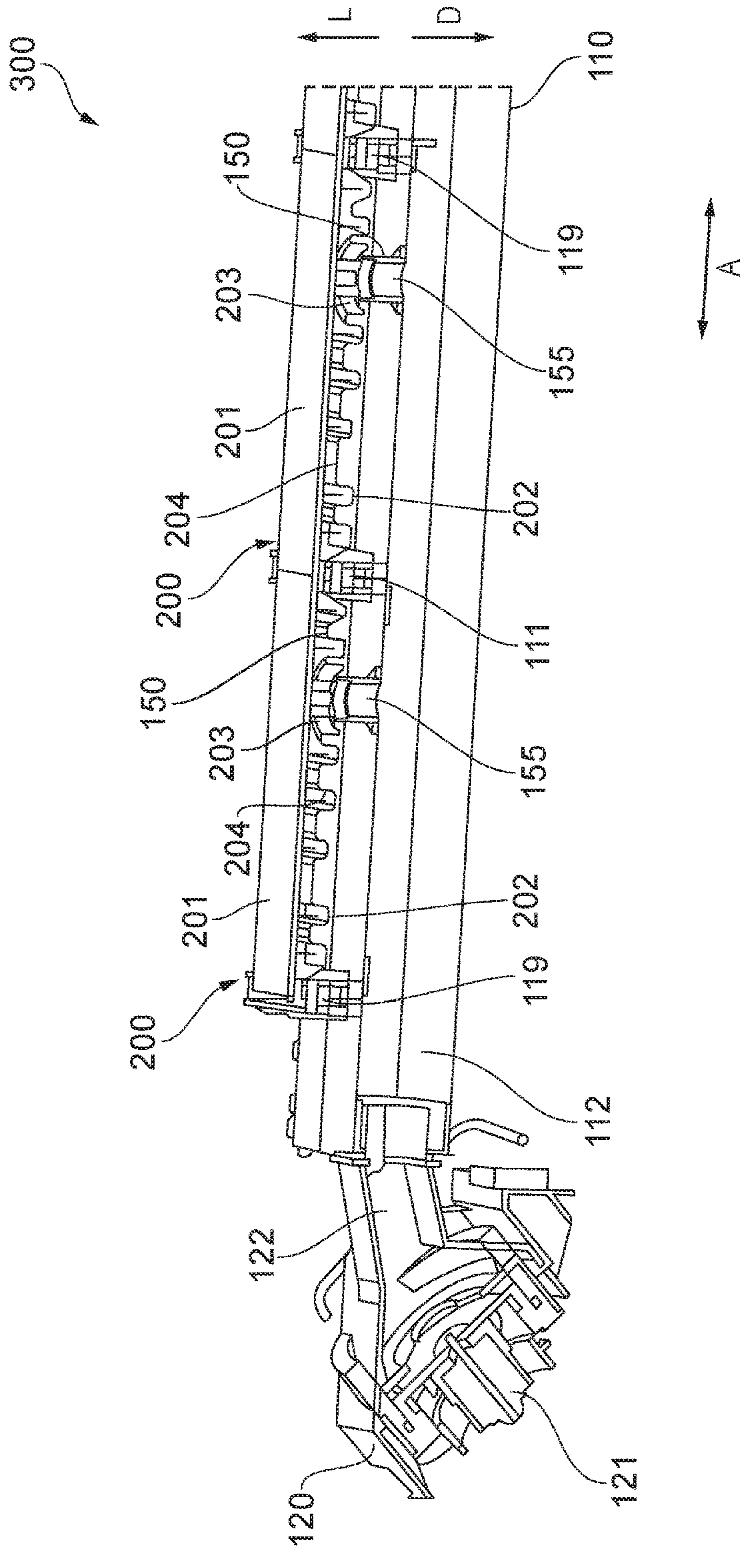
FIG. 3 is a simplified schematic of an example printing apparatus comprising an example vacuum system.

FIG. 3 shows a side view of a cross section of a printing apparatus 300 with two print units 200 being connected to the vacuum system 100. Each print unit 200 comprises a print platen 201 and a print unit wall 202 (these may be sealed together to form the print unit). Together, the print platen 201 and print unit wall 202 define a chamber 204 of the print unit 200. The chamber 204 is a vacuum chamber of the print unit 200 in that it is to be connected to the source of vacuum. To connect the chamber 204 to a source of vacuum, an opening 203 is provided in the print unit wall 202 (and therefore in the print unit 200 when the platen 201 and wall 202 are assembled to form the print unit). Therefore, when the print unit 200 is assembled the opening 203 provides a (and in one example, the only) point of entry into the sealed chamber 204. The print platen 201 and/or the print unit wall 202 may comprise plastic materials which may reduce the cost of manufacturing each print unit 200.

Therefore, in the example printing apparatus 300 of FIG. 3, the print platen may be sealed but the print platen is not sealed directly to the structural member. Rather, each print unit comprises a print platen sealed (e.g. by welding, such as ultrasonic, vibration or heat, or adhesive) to a print unit wall, with a vacuum being supplied to the chamber 204 provided therein via the vacuum system described with reference to FIGS. 1 and 2. In other words, the printing apparatus 300 comprises a modular platen with a vacuum chamber that may be made without the use of additional seals. The coupling 150 functions to connect each print unit 200 to the structural member so that the chamber of each unit is connected to the source of vacuum. The coupling also functions to ensure sealing with the vacuum chamber. The coupling also functions to improve the assembly and disassembly process of the printing apparatus, in that the resiliently deformable material enables a user to easily add and remove individual print units from the printing apparatus. These features will be described with reference to some examples below.

FIG. 3 is a side view of a cross section of the printing apparatus 300 with two print units 200 being connected to the vacuum system 100. As with the examples of FIGS. 1-2, the vacuum source 120 is connected to the structural member 110 such that the vacuum fluid conduit 122 is connected to the fluid conduit 112 of the structural member 110 so as to provide the fluid conduit 112 of the structural member 110 with a source of negative pressure, i.e., with a source of suction. The printing apparatus of FIG. 3 comprises two print units 200 and two couplings 150, each coupling being connected to a respective print unit. The fluid passage 155 of each coupling 150 is fluidly connected to the fluid conduit 112 of the structural member 110. Each coupling 150 is connected to a respective print unit wall 202 of a print unit 200 at its second, resiliently deformable, end 152. Each coupling 150 is therefore connected to a print unit 200 such that the fluid passage 155 of each coupling 150 is connected to the chamber 203 of a respective print unit 200. When the vacuum generator 121 is supplying negative, suction, pressure this will, via the vacuum conduit 122, fluid conduit 122 and fluid passage 155, be supplied to the chamber 203 of each print unit 200. Therefore, in one example, when each print unit 200 is connected to the structural member 110 the opening 203 in each print unit wall 202 is aligned with the fluid passage 155 of a respective coupling 150 as to fluidly connect the chamber 204 to the coupling 150. In other words, each print unit 200 is connected to the coupling 150 so as to fluidly connect each chamber 204 with the fluid passage 155. When, as is depicted in FIG. 3, a plurality of print units 200 are provided to make up a modular printing apparatus 300, the plurality of print platens 201 make up a (modular) print platen of the printing apparatus 300. As each print unit 200 comprises a vacuum chamber 203, each print platen 201 will hold the print media to the platen 201 and therefore the print media will be held to the modular patent (comprising the platen 201 of each print unit 200).

In accordance with one example, a number of print units 200 may therefore be connected to the vacuum system 100 to make up a printing apparatus 300 comprising a number of print units 200. In this way, the printing apparatus is a modular printing apparatus with each print unit 200 unit being a module of the printing apparatus. The printing apparatus 300, the print apparatus 300 comprising the vacuum system 100 and a number of print units 200, with each print unit 200 may be attached to the vacuum system 100 via the structural metal beam 110.

As shown in FIG. 3 the connector provides one support between the print unit 200 and the structural member 110. However, in some examples each print unit 200 may also be supported by a support 119. In one example the support 119 is located in between the print unit 200 and the structural member 110 to support the print unit 200 against the structural member 110. The support 119 may therefore be connected, at one end, to the structural member 110 and, at another end, to the print unit 200. In one example, each print unit 200 is associated with a connector 150. In another example, each print unit 200 is associated with a support 119. In this way, the connector may 150 function to support each print unit 200, but each print unit 200 is also supported by another support 119. The support 119 may be to avoid dislodgement of a print unit 200. Adjacent print units may be joined as will be explained below, for example in such a way so as to minimise air leakages from the vacuum chambers.

Figure 4:
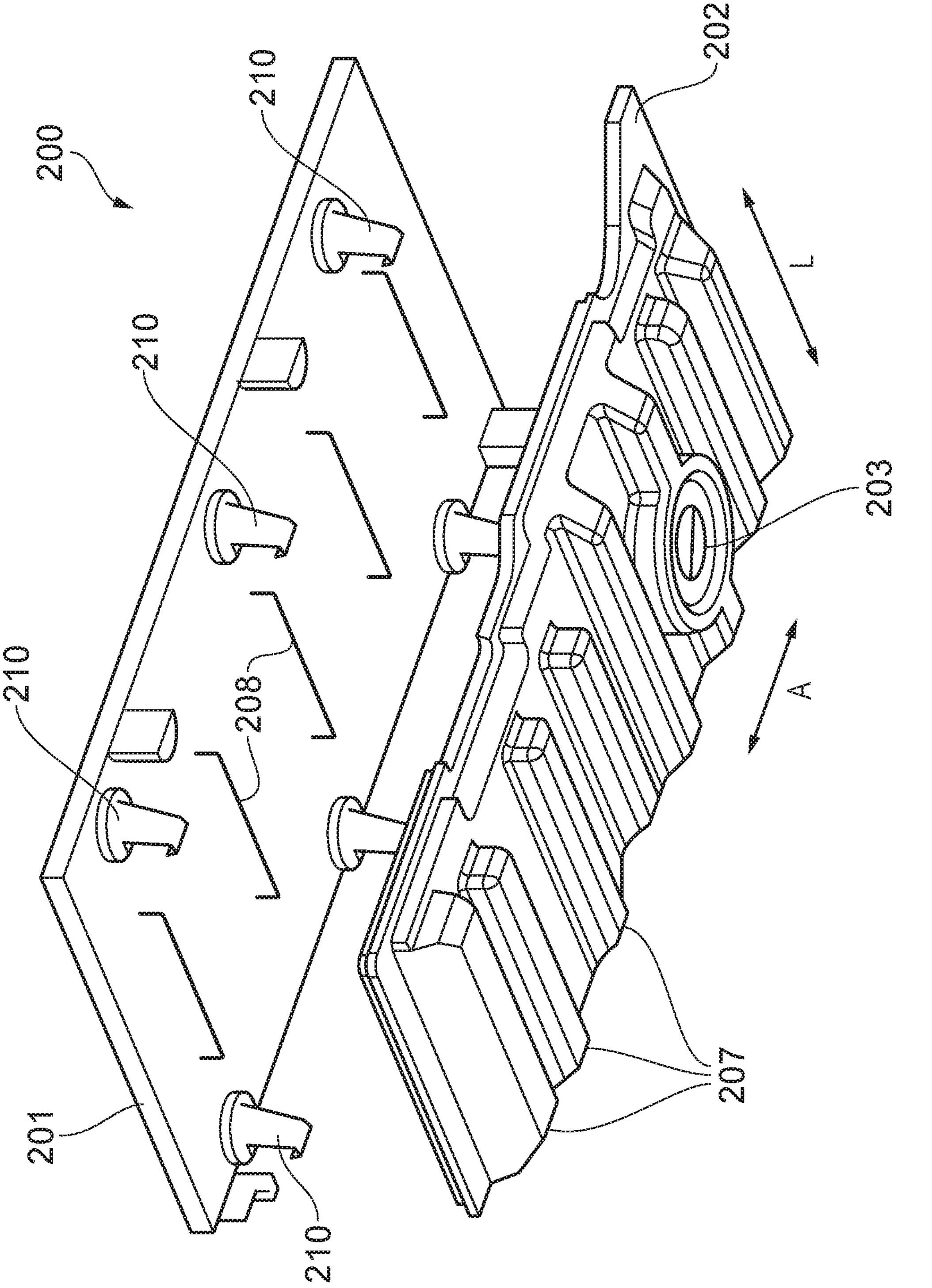
FIG. 4 is an exploded view of an example print unit, for example for use in the example printing apparatus of FIG. 3.
Figure 5A:
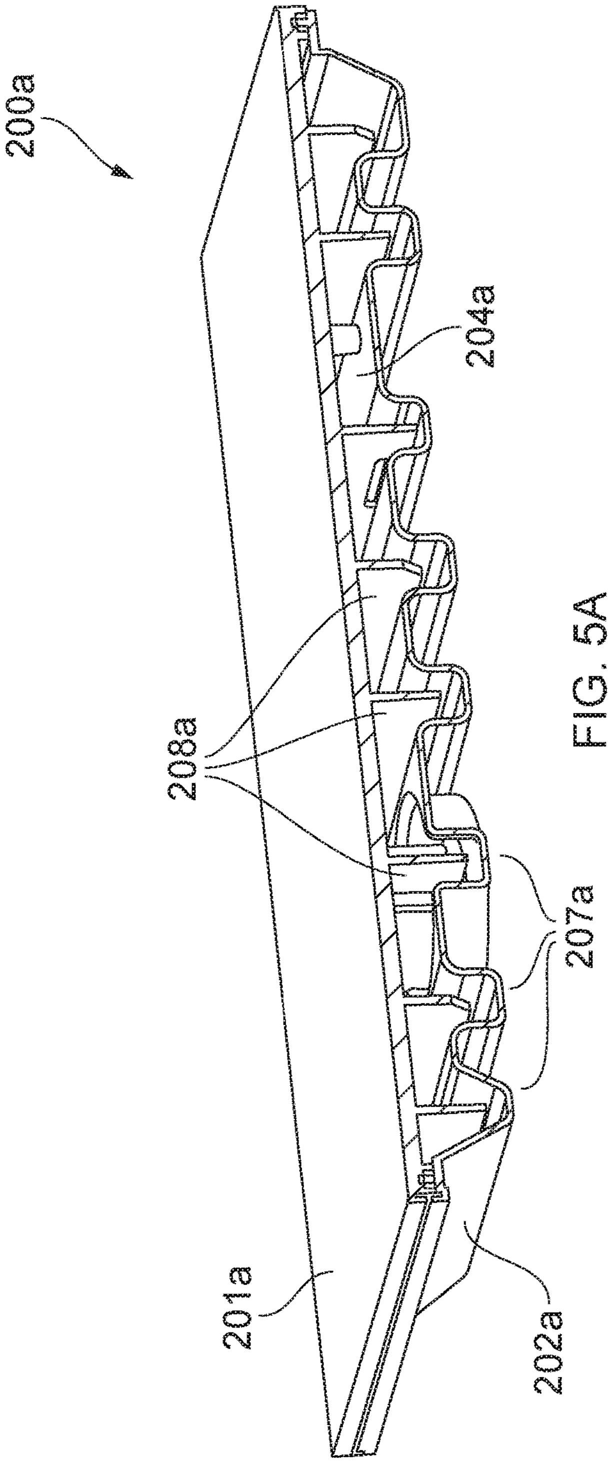
FIG. 5A shows a longitudinal cross-section of an example print unit.
Figure 5B:
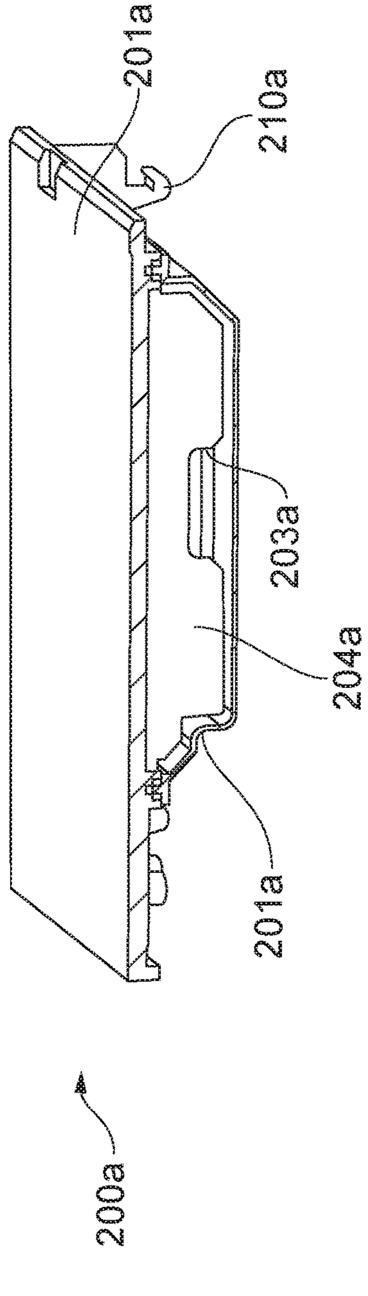
FIG. 5B shows a transversal cross-section of the example print unit of FIG. 5A.
Figure 5C:
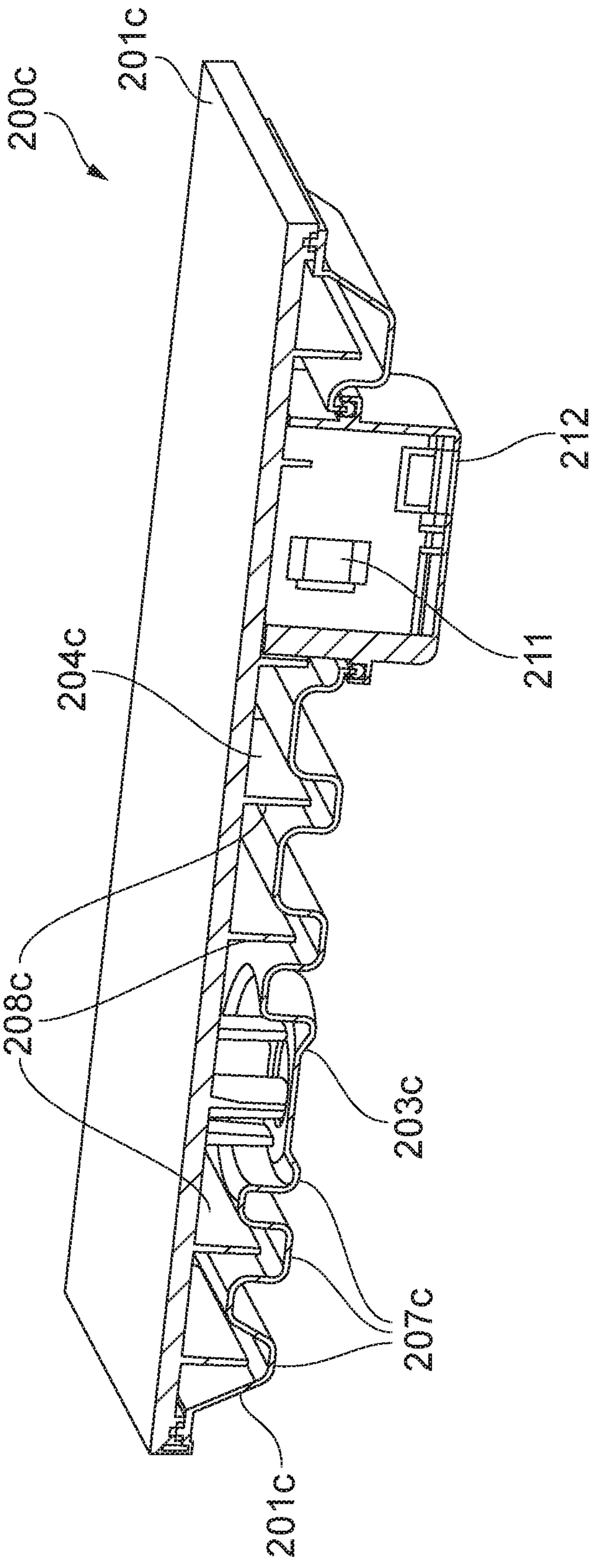
FIG. 5C shows a longitudinal cross-section of an example print unit.

FIG. 4 shows an example print platen 201 and an example print unit wall 202 prior to assembly to form an example print unit 200. The print unit wall 202 of this example comprises a number of grooves 207 and the print platen 201 comprises a number of baffles 208. Together (e.g. once the print platen 201 and print unit wall 202 have been assembled to define the print unit 200) these define the serpentine shape of the chamber 203. The geometry and design of the grooves and baffles also facilitate movement of the print platen 201 and the print unit wall 202 (and therefore the print unit 200 when assembled) in the "transverse" or "crossweb" direction (arrow A in FIG. 5) but ensure that the print platen 201 and the print unit wall 202 (and therefore the print unit 200 when assembled) is rigid in the media advance direction (arrow L in FIG. 5). The print unit 200 may be formed by joining (for example by welding or adhesion) the print platen 201 to the print unit wall 202. The grooves 207 and baffles 208 in, respectively, the print platen 201 and print unit wall 202 create a stiffness in the print unit 200 in the media advance direction that is higher than the stiffness in the crossweb direction. In one example, the stiffness of the print unit is 5 times higher in the media advance direction than the crossweb direction. Such higher stiffness ensures that the print unit is deformable only in the crossweb direction. In one example the stiffness in the media advance direction is at least 240 $Nm^2$. Stiffness in this example may be defined as the product of Youngs modulus and the second moment inertia of the print platen. FIGS. 5A and 5C respectively show longitudinal (in the media-advance direction) cross-section of two example print units 200*a* and 200*c*. FIG. 5B shows a transversal (in the crossweb direction) cross-section through the example print unit 200*a* depicted in FIG. 5A. Each print unit 200*a*, 200*c* comprises a respective print platen 201*a,c* and print unit wall 202*a,c* that define a chamber 204*a,c* therebetween. Each example print unit 200*a,c* is formed from joining (e.g. welding or adhering) respective print platens 201*a,c* to respective print unit walls 202*a,c*. The print unit wall 202*a,c* of each print unit 200*a,c* comprises an opening 203*a,c* for connection to a fluid conduit (e.g. of a coupling 150) and which defines a single point of entry into the chambers 204*a,c*.

FIG. 5A shows an example assembled print unit 200*a* such as the example print units 200 depicted in FIGS. 1-6, the print unit 200*a* of this example comprising a number of baffles 208*a* (in this example, the print platen 201*a* comprises the baffles 208*a*) and ridges 207*a* (in this example, the print unit wall 202*a* comprises the ridges 206) defining a labyrinthine, or serpentine, path for air in the chamber 204*a*.

As can be seen in FIG. 5A, the ribs 208*a* are parallel to the media advance direction of the print unit 200*a*, which can make the assembly stiffer in this direction than the perpendicular direction (the crossweb direction). In this way, the ribs 208*a* may be considered to be reinforcing ribs. In this example, the print unit 200*a* does not have any (reinforcing) ribs in the crossweb direction. The overall effect in this example is that the print unit 200*a* is able to bend in crossweb direction but not in media advance direction.

A cross-section through the print unit 200*a* is shown in FIG. 5B. The ridges and baffles are not visible in FIG. 5B, but FIG. 5B does show the chamber 204*a* and opening 203*a*, representing a point of entry into the sealed chamber 204*a*. The view of the print unit 200*a* in FIG. 5B shows that the print unit 200*a* comprises a hook 210. As will be explained below the hook 210 is to engage a corresponding (in one example, correspondingly sized and/or shaped) opening in the structural member 110 so as to attach the print unit to the structural member. Although in this example the print platen 201*a* comprises the hook 210 in other examples the print unit wall 202*a* may comprise the hook. FIGS. 5A and 5B therefore depict different views of the same example print unit 200*a*. FIG. 5A is a longitudinal cutaway view while FIG. 5B is a transversal cutaway.

FIG. 5C shows an example assembled print unit 200*c*. Like the example print unit 200*a* of FIG. 5A, the print unit 200*c* of this example comprising a number of baffles 208*c* (in this example, the print platen 201*c* comprises the baffles 208*c*) and ridges 207*c* (in this example, the print unit wall 202*c* comprises the ridges 206*c*) defining a labyrinthine, or serpentine, path for air in the chamber 204*c*. Unlike the example of FIG. 5A the print unit 200*c* comprises a sensor housing 212 for a sensor 211. The sensor 211 in this example is a media advance sensor. In this example the sensor housing 212 may be defined by the print unit wall 202*c* and print platen 201*c*. In other words, in one example, the print unit wall 202*c* may comprise a portion for receipt of a sensor 211. This portion, together with a portion of the print platen 201*c*, may define the sensor housing 212. Accordingly, the example platen 200*c* shown in FIG. 5C provides a sealed chamber with a print platen and a housing for a sensor. FIGS. 5A and 5C therefore depict different concepts of an example print unit 200*a,c*, with the example print unit 200*c* of FIG. 5C providing room for a sensor. Print units such as 200*a* and 200*c* may be joined to form a single print platen of a printing apparatus.

Therefore, according to some examples, a printing system 300 may comprise a number of modular print units 200 that are joined together to form a print platen of the printing system and a vacuum chamber of the printing system, each individual print unit 200 comprising a modular print platen and a module vacuum chamber. FIGS. 5A-5C depict different geometries and designs of print units 200 and a number of print units 200, may be joined together to form a print platen of the printing system 300. For example, a print platen may be made up of the print platens of a plurality of print units 200*a*, such as is depicted in the example of FIG. 5A. In another example, a print platen of a printing apparatus may comprise several print units of the type 200*c*.

To form part of the apparatus, each print unit 200 may be secured to the structural member 110 via engagement between the hook 210 and the opening 114 in the structural member 110. This will now be described with reference to the examples shown in FIGS. 6A and 6B.

Figure 6A:
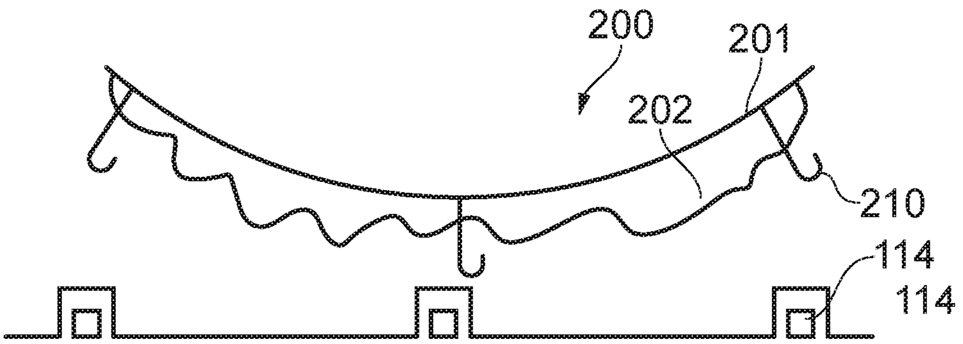
FIGS. 6A and 6B schematically show the process of attaching an example print unit to an example vacuum system.
Figure 6B:
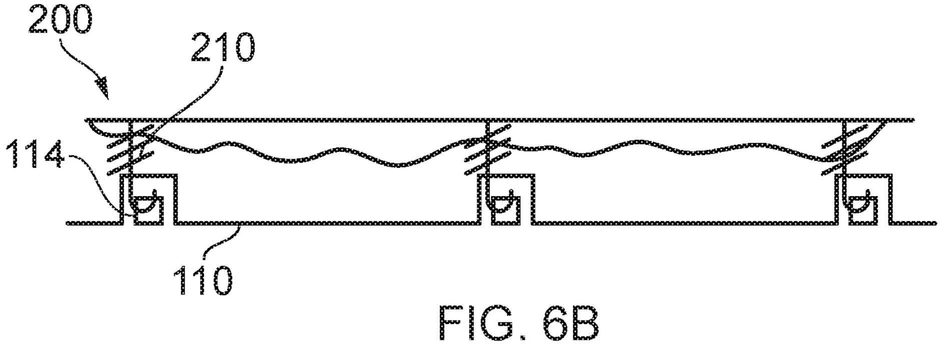

FIGS. 6A and 6B show schematically how an assembled print unit 200 (such as the assembled print unit 200*a* or 200*c*) may be connected to the vacuum system 100 to form part of the modular printing apparatus 300. As described above with reference to the example of FIG. 4, the geometry and design of the print units facilitates movement of the print platen 201 and the print unit wall 202 (and therefore the print unit 200 when assembled) in the "transverse" or "crossweb" direction. FIG. 6A shows this movement, and part of the process to assemble the print unit 200 or, as shown in FIG. 6A, to attach the print unit 200 to the structural member 110, may be to bend the print unit in the crossweb direction. The print unit 200 of the examples of FIGS. 6A and 6B comprise a plurality of hooks 210. These may, in one example and as shown in FIGS. 6A and 6B be provided on the print platen 201 of the print unit 200 or in another example may be provided on the print unit wall 202 of the print unit 200. As shown in the FIG. 6B example, the structural member 110 comprises a plurality of openings and, to connect the print unit 200 to the structural member 110, each hook is engaged in a respective slot. As the FIG. 6B example shows, the hook and slot engagement may flatten, or level out, the print unit 200 and therefore flatten the print platen 201 to result in a smooth surface for the print media to advance. Attaching a plurality of print units 200 to the structural member 110 in this way may therefore create a modular, flat, print platen of the printing apparatus. In some examples the hook 210 and opening 114 may provide an interference fit. In some examples, the hook 210 may be spring-loaded.

As FIGS. 6A and 6B show, the print platen 201 may comprise a U-shaped cross section, for example in the media advance direction. In one example 2.25 mm may be the maximum distance between the two limbs of the U, when the print platen 201 is in its natural, unreformed, state. Therefore, in one example the print platen 201 be naturally biased into a U-shape of width 2.25 mm. In order to deform the U-shaped platen (for example in order to attach it to the print unit wall to form the print unit, and thereafter to attach the print unit to the structural member) a bending force is applied to deform the platen towards the structural member. This may be achieved by a spring that is to exert a pushing force on the platen (e.g. in an upwards direction relative to the printing apparatus in use).

Figure 7:
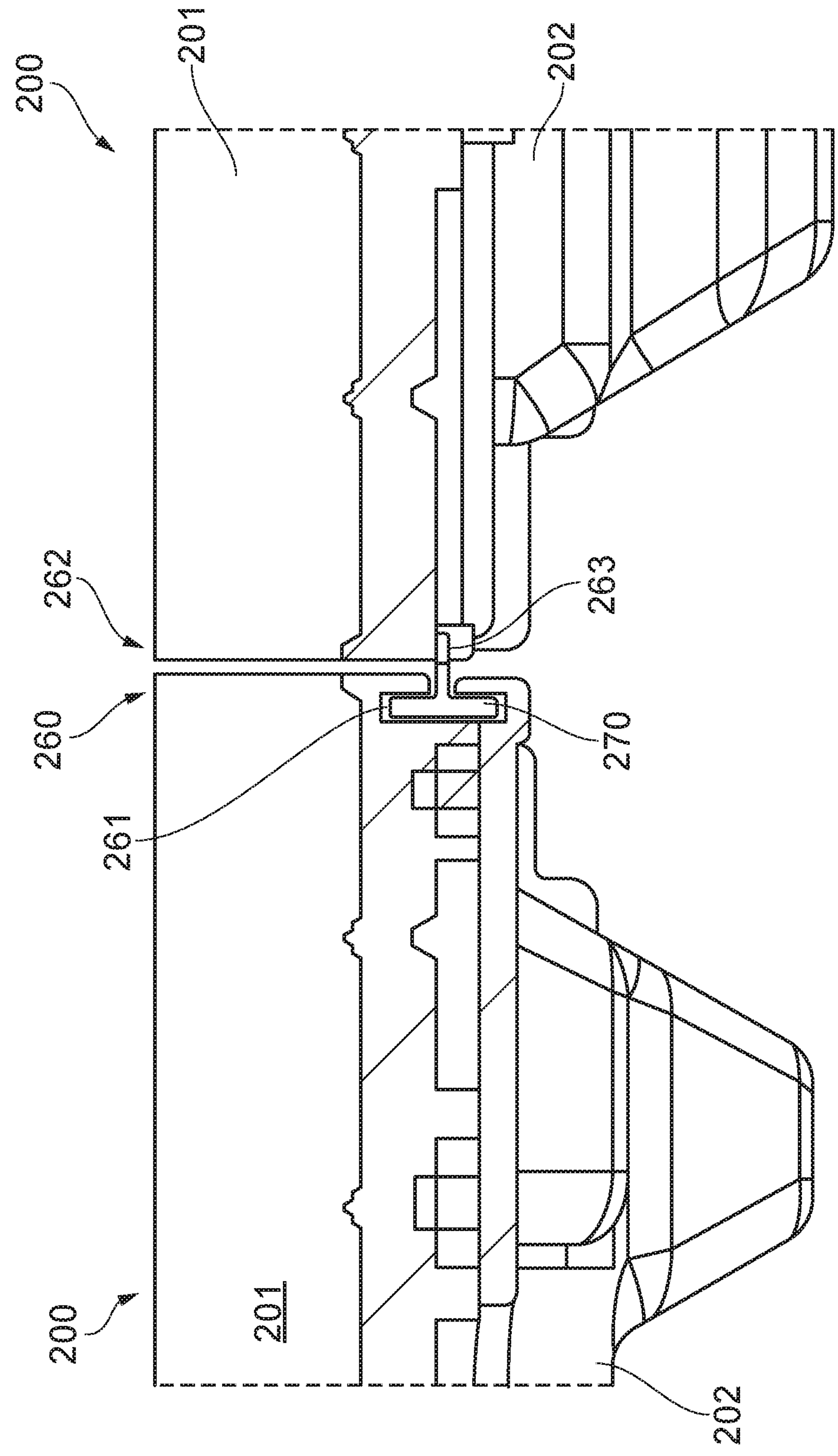
FIG. 7 shows a cross-section through two example print units that are joined together.

When two print units 200 are disposed, side-by-side, in the printing apparatus they may be connected such that their respective chambers 203 (which will serve as vacuum chambers when they are fluidly connected to the source of vacuum 120). FIG. 7 shows one such example way of joining adjacent print units 200.

FIG. 7 shows a first print unit 200*d* and a second print unit 200*e* (these may comprise any of the print units 200*a* or 200*c* as sown in FIG. 5A-C or may comprise a different print unit). Each print unit 200*d*, 200*e* comprises an opening for receipt of a seal. According to the example print units shown in FIG. 7, a second end 260 of the first print unit 200*d* comprises T-shaped opening 261 and a first end 262 of the second print unit 200*e* comprises an I-shaped opening 263. Together, the two openings define a T-shaped opening spanning the two print units for receipt of a T-shaped seal 270. Each opening may be in communication with the chamber of each respective print unit. The seal may function to seal the chamber so that no air escapes the chamber of each print unit. The seal may function to seal the gap between adjacent print units and adjacent print platens. In turn, this may reduce the air between adjacent platens which may reduce print quality defects such as vertical banding. An opening for the seal may provide in a side wall of the print unit. An opening may be provided in the print platen and the print unit wall. For example, an upper part of the T-shaped opening may be provided in the print platen and a lower part of the T-shaped opening may be provide in the print unit wall, the T-shaped opening being thereby formed by the joining of the print platen and the print unit wall. As the print units comprise openings for receipt of (part of) the seal, the seal stays in position due to the mechanical entrapment.

In some examples each print unit will comprise each opening. For example, each print unit may comprise a first end and a second end, the first end comprising the T-shaped opening and the second end comprising the I-shaped opening. In this way each print unit may be adjoined to two print units, one on the left and one on the right, with the interface between each print unit being as depicted in FIG. 7. In other examples, each print unit may comprise an opening for a seal, but the seal may be of a shape other than that a T-shape. In yet another example some print units may only comprise one opening for receipt of a seal (these print units being the units on either end of the print apparatus, and print platen, and therefore will only be connected to one other print unit). As air movement between adjacent print units may create a pattern in drying of the print media, a lack of sealing may produce air leakages which can produce wrinkles in the area between print units when the print media is drying. This, in turn, could produce vertical banding. FIG. 7 therefore shows an example of how two print units (and therefore two print platens) may be disposed adjacent to one another such that any gap between the platens is sealed (for example when there is relative movement between them), and therefore even though the two print units may exhibit relative (shear) movement, their vacuum chambers may remain sealed. This is accomplished, in the FIG. 7 example, without the use of adhesive or stickers and the positioning of the seal is not dependent on the user, as predefined openings for the seal may be manufactured into the print units. Furthermore, removal of a print unit may be achieved without the need to replace one of the seals. The seal may comprise rubber.

Referring again to FIG. 3 where an assembled printing apparatus 300 is shown, it will be appreciated that a number of print units 200 have been attached to the structural member 110 (via the hook and opening arrangement described above with reference to specific examples) to form a continuous print patent of the printing apparatus, each print platen being connected to a vacuum chamber, each vacuum chamber being connected to a vacuum source via a coupling and fluid conduit on the structural member. This allows the costs of manufacturing the printing apparatus 300 to be reduced since the individual parts (print units) for assembling the printing apparatus 300 may be produced in high volume. In one example, assembling printing apparatus 300 by joining a number of individual print units 200 may result in a printing apparatus with a print platen of a crossweb length of 18 inches, 27, 36, 44, 54 or 64 inches. In other examples joining individual print units 200 may result in a printing apparatus with a print platen of another length. A print unit 200 may, in one example, by 9.35 inches wide (length in the crossweb direction). The print units 200 may be able to form print zones of approximately 4 inches long in the media advance direction. The print units 200 may therefore be able to form print zones of up to 4 inches long in the media advance direction, or in another example up to 4 inches long. The print apparatus 300 of FIG. 3 therefore comprises user-removable print zone installations.

The combined print platen of the printing apparatus 300, comprising the print platens of each print unit 200, can adapt to the shape of the structural member 110 which may minimise tolerance errors and manufacturing process variability effects. This is due to the spring-loaded hooks that may follow the shape of the structural member, in some examples. Errors in the dimensions of the components of the printing apparatus may be reduced by providing a deformable print unit 200, since the print unit is able to bend to adapt to the shape of the structural member 110 (e.g. a flat shape) by means of hooks 210. The resulting print platen does not need screws to be assembled and can reduce manufacturing costs, as well as enabling the user to attach and remove the print units themselves (e.g. without a specialist).

To attach a print unit 200 to the printing apparatus 300, a hook 210 of the print unit 200 may be engaged with the structural member 110 via an opening 114 (e.g. via an interference fit). In order to insert the hook 210 through the opening 114 the print unit 200 may be moved in the direction D, relative to the structural member 110. This movement may cause the resiliently deformable material of the coupling 150 to deform so as to allow the hook 210 of the print unit 200 to be at a depth sufficient to engage the opening 114. In other words, the resiliently deformable element on the coupling 150 may permit relative movement between the print unit 200 and the coupling 150. Therefore, when the coupling 150 is attached to the structural member 110, the resiliently deformable element permits relative movement between the print unit 200 and the structural member 110. This relative movement may allow the hooks 210 to engage the openings 114 to join the print unit 200 to the structural member 110 and therefore to form part of the printing apparatus 300. The direction D may be a direction perpendicular to both the crossweb A direction and media advance direction L. The direction D may be a direction parallel to the fluid passage 155 of the coupling 150. The direction D may be considered a downwards direction, being the direction toward the floor when the printing apparatus 300 is in use. It will also be appreciated that, due to the hook-and-opening arrangement of connecting each print unit 200 to the vacuum system 100, and therefore to the printing apparatus 300, the example printing apparatus 300 of FIG. 3 is free from screws, seals in the print units themselves (which would be present if the print platens were sealed directly to a metal structural member), and therefore assembly time and errors are minimised, and production costs, in turn, may be better controlled. As stated above the hook may comprise a spring-loaded hook in some examples. In such examples, the spring may be to apply a direct force to the hook to avoid local bending deformations in the print platen. The spring may serve to bias the hook in a direction outwardly from the print platen. When the print unit is connected to the structural member via the hook and opening, in examples where this provides an interference fit this engagement may avoid unexpected movements such as dislodgement of the print unit. In one example each print unit comprises three pairs of hooks.

Once attached, as shown in FIG. 3, there is provided, in this example, a printing apparatus 300 comprising a vacuum system 100 to connect a number of print units 200 to a source of a vacuum, with each print unit being connected to a fluid conduit of a structural member, the fluid conduit of the structural member being connected to the vacuum source, via a coupling 150 to fluidly connect a chamber of a print unit to the fluid conduit of the structural member. The coupling comprises a resiliently deformable end to connect to the print unit to the structural member and a fluid passage to fluidly connect the chamber of the print unit to the fluid conduit of the structural member. In one example, the printing apparatus 300 comprises one coupling per print unit 200. The print platen of the printing apparatus comprises a plurality of print platens 201, one for each print unit 200 and, as each may be connected to the vacuum source, there may be a uniform vacuum under the print media.

Adjacent print units 200 may be attached via a seal, such as the T-shaped seal depicted in the example of FIG. 7. That each chamber of each print unit is sealed may mean that air will not be sucked from below the print unit (e.g. by the suction pressure created by the vacuum source) which may reduce instances of vertical banding. The seals will additionally permit some movement in the direction D (which, as below, enables the possibility of removing a print unit without removing the seal). The seal does not apply forces in the media advance direction which means the print units may be assembles, and sealed, without the introduction of print quality defects.

To remove a print unit 200 from the printing apparatus 300, the hook 210 is disengaged from the structural member 110. Pushing the print unit 200 in the direction of arrow D this will cause the print unit 200 to move towards the structural member 100, causing deformation of the resiliently deformable element of the coupling 150, against the bias of the resiliently deformable element. The relative movement facilitated by the resiliently deformable element of the coupling 150, and hence facilitated by the coupling 150 itself, allows the hook 210 to be dislodged, or disengaged from, the opening 114 which, in turn, allows the print unit 200 to be removed from the vacuum system 100 and the printing apparatus.

Figure 8:
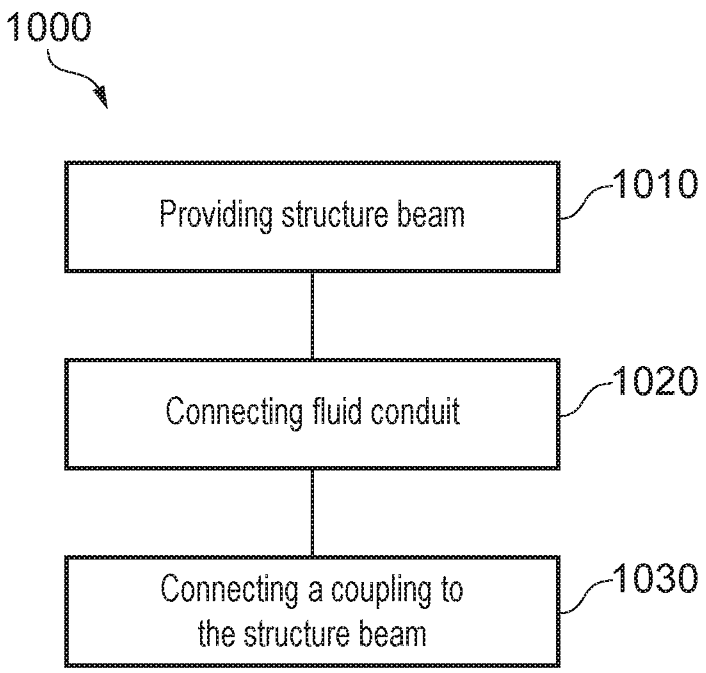
FIG. 8 shows a flowchart of an example method of assembling a print apparatus.

With reference to the FIGS. 1-7, in one example there is provided a method of assembling a print apparatus. FIG. 8 is a flowchart of such an example of a method 1000 of assembling a print apparatus. The print apparatus in one example may be the print apparatus 300 depicted in the figures above.

In block 1010 of the method 1000 a structural beam is provided having a fluid conduit therein. For example, the structural beam may comprise the structural member 110 as described above. In block 1020 of the method 1000 the fluid conduit of the structural beam is connected to a source of vacuum. For example, block 1020 may comprise connecting the fluid conduit 112 to the vacuum 120 as described above.

In block 1030 of the method a first end of a coupling is connected to the structural beam. The coupling comprises a second, resiliently deformable end, and the first and second ends of the coupling define a fluid passage therebetween so as to fluidly connect the fluid conduit of the structural beam to the fluid passage of the coupling. Accordingly, in one example the coupling may comprise the coupling 150 as described above. Block 1030 may comprise providing the coupling.

The method may comprise providing a print unit. The print unit may comprise the print unit 200 as described above and may therefore comprise the print platen 201 and print unit wall 202 defining the chamber 203 therebetween. The method may comprise engaging the hook of the print unit with the opening in the structural beam so as to connect the print unit to the structural member. This may comprise deforming the print unit in the crossweb direction and/or moving the print unit relative to the structural beam to deform the resiliently deformable second end of the coupling so as to engage the hook with the opening. This may provide an interference fit between the print unit and the structural beam. The method may comprise providing and attaching a plurality of print units to a structural beam to form a printing apparatus. The method may comprise connecting the chamber of each print unit to a source of vacuum. To remove one of the print units from the modular system the method may comprise moving the print unit towards and relative to the structural beam to deform the resiliently deformable second end of the coupling and to disengage the hook of the print unit from the opening of the structural beam.

Figure 9:
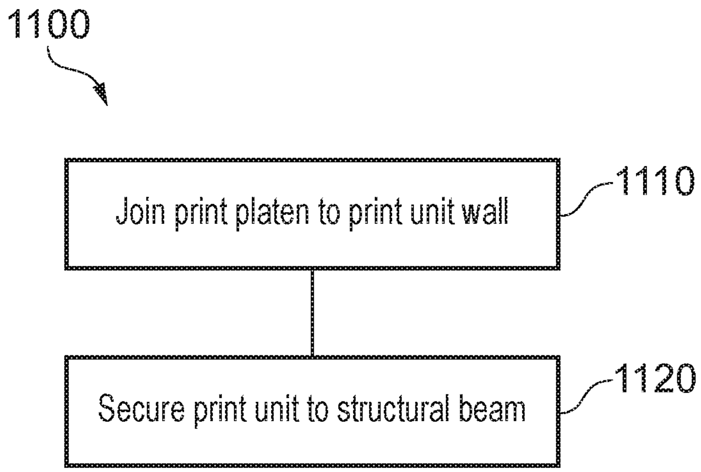
FIG. 9 shows a flowchart of an example method of joining print units.

FIG. 9 shows one such example method 1100 of forming a print unit and joining a print unit to a structural beam. The method 1100 comprises, at block 1110, joining a print platen to a print unit wall to form a print unit. Block 1110 may comprise clamping the print platen and/or print unit wall to a flat surface prior to them being joined. Clamping the platen to a flat surface may force the print platen to the flat surface which creates an assembly inertia that may reduce the platen deformation once it is removed from the clamps. Block 1110 may comprise joining the print platen and print unit wall by welding (for example, by vibration, ultrasonic or heat) or adhesive. Sealing of the print unit, and therefore of the chamber therein, may be accomplished without the use of additional seals. Block 1110 may therefore comprise forming a print unit. To form multiple print units, block 1110 may be repeated for each print unit.

The method comprises, at block 1120, joining the print unit to a structural beam. Block 1120 may be performed for each assembled print unit (assembled at block 1110) and therefore block 1120 may comprise a method of assembling a printing apparatus, such as the method 1000. Block 1120 may, in one example, comprise joining a first print unit to a second print unit. This example may further comprise providing a seal (for example a T-shaped seal) and using the seal to seal any air gaps in between the first and second print units. The method 1000 may be performed in conjunction with, or as part of, the method 1100.

Figure 10B:
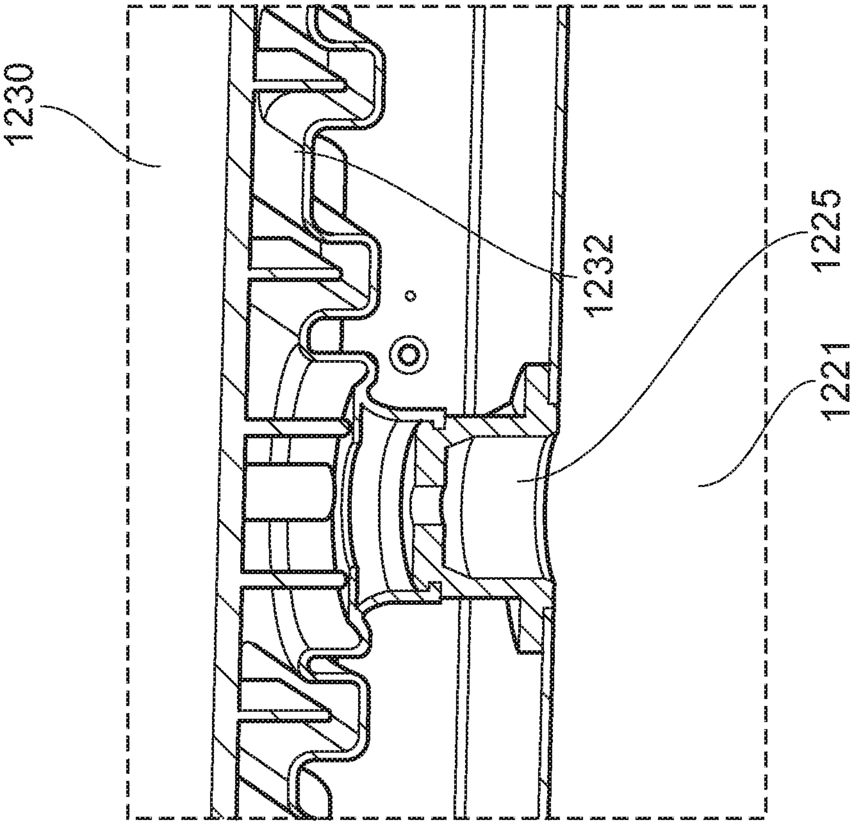
FIG. 10B shows a cross-section through an example connector connected to a fluid chamber of a structural member and a fluid chamber of a print unit.
Figure 10A:
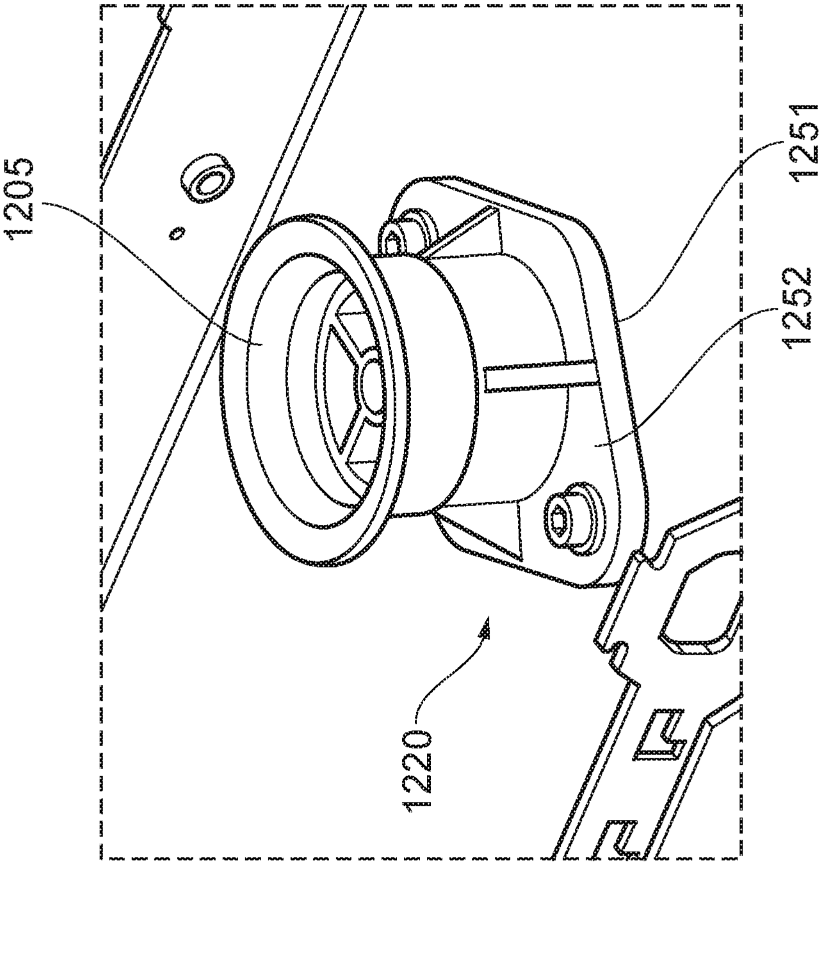
FIG. 10A shows an example connector for fluidly connecting two print chambers of a printing system.

FIGS. 10A and 10B depict an example connector 1200. In one example the connector depicted in FIGS. 10A and 10B may comprise the coupling shown in FIGS. 1, 2, 3, 4, and 6 and as described in relation to the method 1000. The connector 1200 in this example comprises a connector body 1203, a first opening 1201 and a second opening 1202 and a fluid channel 1225 that fluidly connects the first and second openings 1201, 1202. The first opening 1201 is to be connected to a first fluid chamber and the second opening 1202 is to be connected to a second fluid chamber. The second opening 1202 comprises a material 1205 so that relative movement is permitted between the connector 1200 and the second fluid chamber when the second opening 1202 is connected to the second fluid chamber.

The first opening 1201 is connected to a structural member 1220 (such as the structural member as described above in relation to FIGS. 1, 2, 3, 4, and 6. The structural member 1220 comprises a first fluid chamber 1221 and the first opening 1201 is connected to the first fluid chamber 1201. The second opening 1202 is connected to a second fluid chamber 1303. In the example of FIG. 10B the second fluid chamber 1233 is part of a print unit 1230 comprising a print platen 1231 and a print unit wall 1232, for example as described above in relation to FIGS. 1-9.

The first opening 1201 is provided at a first end 1251 of the coupling 1200. The first end 1251 comprises a flange 1252, depicted as a circumferentially extending flange to enable securement to the structural member via a number of fasteners, depicted by way of example only in FIG. 10A as bolts. The material 1205 to enable the relative movement as described above may comprise a resiliently deformable material and may, for example, comprise plastic or rubber. The material 1205 may comprise a circumferentially extending collar.

Referring to FIG. 10B, when the connector 1200 is, as shown, connected to first and second fluid chambers (such as the structural member's fluid chamber and the print unit's fluid chamber) the connector 1200 facilitates fluidic connection between the two chambers. Therefore, the first and second chambers may be in fluid communication via the connector 1200. The connector 1200 is therefore a device for permitting fluid communication between two fluid chambers, e.g. of a printing apparatus.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A vacuum system for a printing apparatus comprising:

a structural member comprising a fluid conduit to be connected to a vacuum source; and a coupling wherein the coupling comprises a first end and a second end defining a fluid passage therebetween, wherein the coupling is attached to the structural member at its first end thereby connecting the fluid passage of the coupling to the fluid conduit of the structural member, and wherein the second end of the coupling comprises a resiliently deformable material and wherein the second end is to connect to a vacuum chamber of a print unit, wherein the print unit comprises a hook having a spring to engage with an opening in the structural member so as to attach the print unit to the structural member via an interference fit.

2. A vacuum system according to claim 1, wherein the print unit further comprises a print platen and a print unit wall connected to the print platen, the print platen and print unit wall defining a vacuum chamber therebetween, wherein the print unit wall comprises a print unit wall opening to connect to the second end of the coupling.

3. A vacuum system according to claim 2, wherein the print unit wall comprises a plastics material.

4. A vacuum system according to claim 1, wherein the first end of the coupling comprises a rigid material.

5. A vacuum system according to claim 1, wherein the structural member comprises a metal.

* * * * *